United States Patent [19]

Filleau

[11] Patent Number: 5,027,648

[45] Date of Patent: Jul. 2, 1991

[54] METHOD AND DEVICE FOR MEASURING THE ANGLE OF ROTATION OF THE STEERING SHAFT OF A MOTOR VEHICLE

[75] Inventor: Jean-Bernard R. L. A. Filleau, Castenet Tolosan, France

[73] Assignee: Siemens Aktiengesellschaft, Munich, Fed. Rep. of Germany

[21] Appl. No.: 375,743

[22] Filed: Jul. 5, 1989

[30] Foreign Application Priority Data

Jul. 5, 1988 [FR] France .................. 88 09057

[51] Int. Cl.$^5$ .......................................... G01M 19/00
[52] U.S. Cl. .................................................. 73/118.1
[58] Field of Search .................. 73/118.1; 280/691, 91, 280/701

[56] References Cited

U.S. PATENT DOCUMENTS 4,733,878 3/1988 Kanazawa et al. .................... 280/91

FOREIGN PATENT DOCUMENTS

3533249A1 3/1987 Fed. Rep. of Germany .
57-130862 8/1982 Japan .
60-122409 6/1985 Japan .
2057693 8/1980 United Kingdom .

Primary Examiner—Jerry W. Myracle
Attorney, Agent, or Firm—Hill, Van Santen, Steadman & Simpson

[57] ABSTRACT

The method consists in measuring the speed, VV, of the vehicle, in comparing the current speed, VV, to a predetermined speed, VM, in order to zero a shaft turn counter when, VV, is greater than, VM. VM, is updated to the value, VV, when, VV, is greater than, VM. The direction of movement of a steering shaft in the vehicle into a position corresponding to an extreme of the signal emitted by an angular position sensor coupled to the shaft and sensitive to the angular position of the shaft during one turn is detected, in order to increment or decrement the counter according to the direction detected. The number of turns recorded is combined with the current signal, VS, emitted by the sensor in order to form a signal representing the angle of rotation of the steering shaft, during several turns. The implementation of the method is a device for controlling, for example, an adaptable suspension for a motor vehicle.

17 Claims, 1 Drawing Sheet

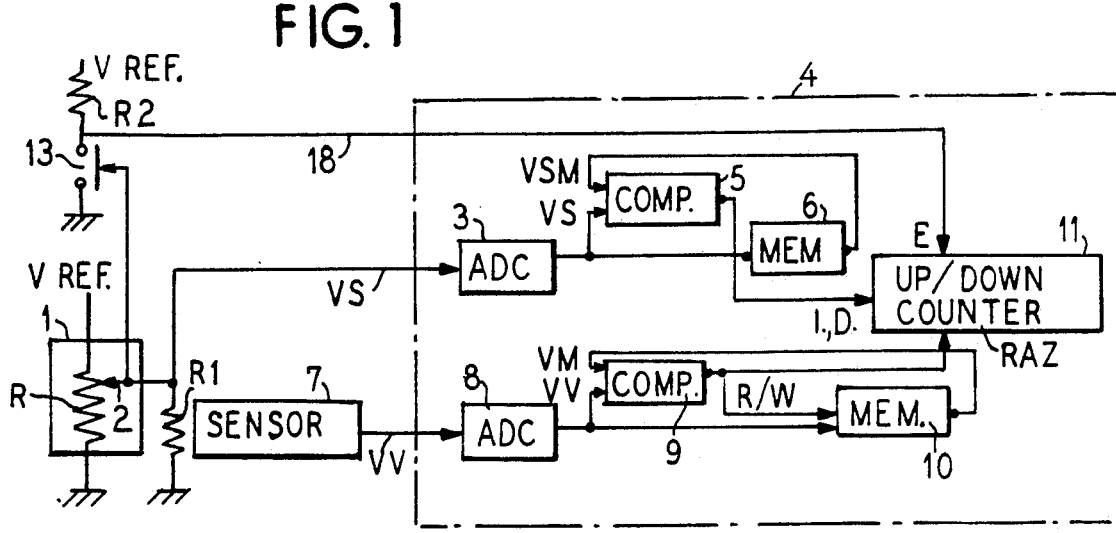
FIG. 1
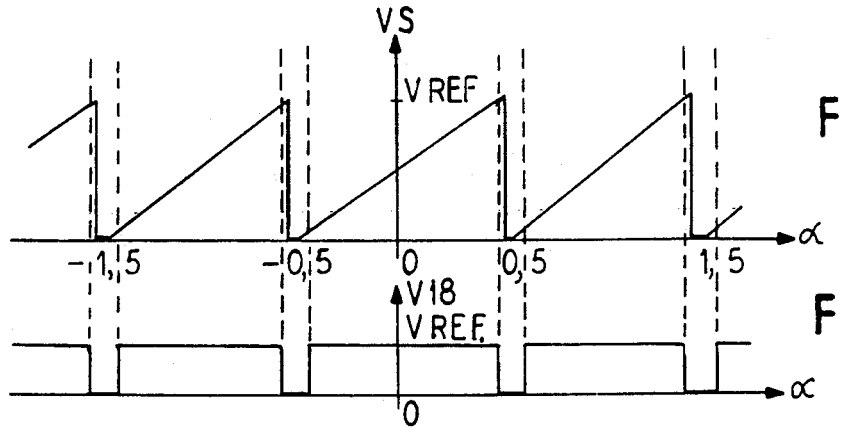
FIG. 2A
FIG. 2B
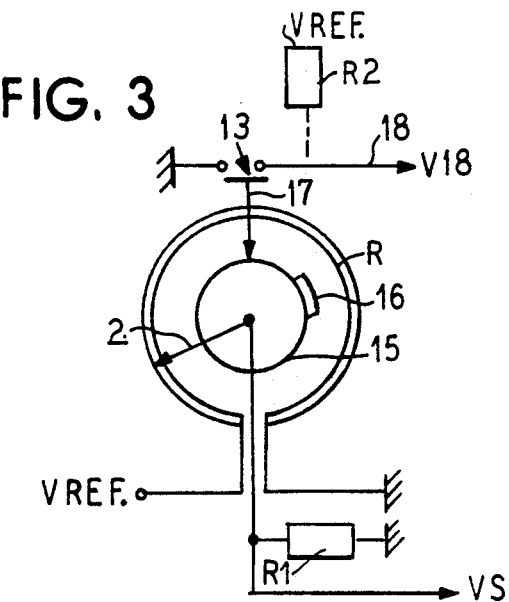
FIG. 3

METHOD AND DEVICE FOR MEASURING THE ANGLE OF ROTATION OF THE STEERING SHAFT OF A MOTOR VEHICLE

BACKGROUND OF THE INVENTION

The present invention relates to a method and a device for measuring the angle of rotation of the steering shaft of a motor vehicle and, more particularly, to a method and a device designed to be used with an angular position sensor which emits a signal representing the relative position of the steering shaft for only one turn.

In certain modern motor vehicles, an angular position sensor sends a signal representing the angle of rotation of the steering shaft, or of the steering wheel, of the vehicle to an electronic computer which is part of a device for controlling an adaptable suspension, for example. The angle of rotation of this shaft determines the steering angle of the wheels and, consequently, the resulting lateral acceleration of the vehicle. The suspension of the vehicle is corrected according to the result of the calculation of the lateral acceleration.

In order to measure the angle of rotation of the steering shaft, use is commonly made of a potentiometric sensor coupled mechanically to this shaft by a gear train ensuring reduction of the rotation of the shaft. This gear train adapts the total angular travel of the steering shaft (equal to several turns) to that of the wiper of the potentiometric sensor (equal to one turn only). The presence of this gear train adversely affects the cost of such a sensor.

SUMMARY OF THE INVENTION

An object of the present invention is to provide a method for measuring the angle of rotation of the steering shaft of a motor vehicle with a potentiometric sensor which does not need to be mechanically coupled to the steering shaft by a gear train, so as to reduce the cost of a measuring device designed for implementing this method.

Another object of the present invention is to provide such a low-cost device, without this saving in cost affecting the precision of the measurements performed.

These objects of the present invention, as well as others which will become apparent below, are achieved by a method for measuring the angle of rotation of the steering shaft of a motor vehicle with an angular position sensor which emits a signal representing the relative position of the shaft on one turn. According to this method, the speed VV of the vehicle is measured, VV is compared to a predetermined speed VM and a shaft rotation counter is zeroed when VV is greater than VM. The direction of movement of the shaft to a position corresponding to an extreme of the signal emitted by the sensor is detected, in order to increment or decrement the counter according to the direction detected. The number of turns recorded in the counter is combined with the current signal emitted by the sensor in order to form a signal representing the angle of rotation of the steering shaft.

The value VM of the speed is loaded in a memory and the value loaded in the memory is updated with the current value VV of the speed of the vehicle when VV is greater than VM.

According to a first option, the values of the signal supplied by the sensor in the vicinity of an extreme of this signal, on either side thereof, are compared, and the counter is incremented or decremented depending on whether this comparison results in a variation of the signal in one direction or in the opposite direction.

According to a second option, the magnitude and sign of the variations in the signal emitted by the sensor are measured, and the counter is incremented or decremented when a signed discontinuity of this variation is detected, depending on whether this signed discontinuity has one sign or an opposite sign.

In order to implement this method, the present invention provides a device having an angular position sensor coupled in rotation with the steering shaft so as to emit a signal representing the relative position of this shaft on only one turn. It also has a sensor for measuring the speed VV of the vehicle, a shaft rotation counter, comparator for comparing the speed of the vehicle to a predetermined speed VM, means for zeroing the counter when VV is greater than VM, means for detecting the direction of movement of the steering shaft through an angular position corresponding to an extreme of the signal emitted by the sensor, means for incrementing or decrementing the counter according to the direction detected, and means for combining the count of the counter and the current signal emitted by the sensor in order to form a signal representing the angle of rotation of the steering shaft.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a block diagram of the measuring device according to the present invention;

FIGS. 2A and 2B are graphs of the voltage emitted by a potentiometric sensor forming part of the device of FIG. 1, and of a voltage activated by a switch also belonging to this device, as a function of the angle of rotation of the steering, shaft, or the steering wheel, of the vehicle respectively; and FIG. 3 is a diagram of an embodiment of an angular position potentiometric sensor suitable for implementing the present invention.

DESCRIPTION OF THE PREFERRED EMBODIMENT

The present invention is based on an observation concerning the behavior of the driver and his action on the steering wheel of the vehicle, depending on the speed of the vehicle. At a standstill or low speeds, very large angles of rotation of the steering wheel (greater than one turn) may be necessary, during parking maneuvers for example.

On the other hand, at high speeds, the amplitudes of the rotations applied to the steering wheel by the driver are much smaller (less than one turn), for example, for keeping the vehicle on the road.

From a certain speed it is therefore possible to estimate that the steering wheel of the vehicle and the steering shaft occupy an angular position which is situated in the first turn of this shaft, starting from the position corresponding to the vehicle traveling in a straight line.

According to the present invention, this observation is advantageously applied by counting the number of turns of the steering shaft from a first reference turn determined by taking into account the speed of the vehicle and by deducing the total angle of rotation of this shaft, through addition to the rotation corresponding to this number of turns, of the rotation detected by a potentiometric sensor emitting a signal representing the relative position of the steering shaft on only one turn. To achieve this, the method according to the present invention uses a routine for detecting the presence of the steering shaft during this first reference turn, a routine implemented by means of the device in FIG. 1.

In this figure it can be seen that the device according to the present invention has a potentiometric sensor 1, the wiper 2 of which slides on a resistance R connected between ground and a reference voltage source Vref. Thus, according to the position of the wiper 2, the voltage VS on this wiper 2 varies practically in linear fashion between 0 and Vref, this variation being repeated for each turn of the wiper 2. The wiper 2 is mounted in rotation so as to be in electrical contact with the resistance R consisting, for example, of a substantially circular resistive track, such as the track R of the sensor in FIG. 3. The periodic shape of the signal VS, as a function of the angle of rotation of the steering shaft (or number of turns of the steering wheel), is shown in the graph in FIG. 2.

With reference again to FIG. 1 it will be understood that the wiper 2 rotates with the steering shaft whose angle of rotation is to be determined. A resistance R1 is mounted between ground and the wiper, for a purpose which will be described further below. The voltage VS on the wiper 2 is supplied to an analog-digital converter 3 forming part of an electronic digital computer 4. The output of the converter 3 is connected to an input of a comparator 5 and to a random access memory 6 which stores a current sampled value VSM of the signal VS, the voltage on the wiper 2 of the sensor 1.

At the same time, a speed sensor 7, of any known type, supplies the computer 4 with a signal VV representing the speed of the vehicle, the signal being digitized in an analog-digital converter 8. This digitized and sampled signal is sent to a comparator 9 and to a random access memory 10, the output of which is connected to the other input of the comparator 9. The output of the comparator 9 is connected to a write command input R/W of the memory 10 and, to a zeroing input RAZ of an up and down counter 11.

As will be seen further below, the up and down counter 11 serves to count the turns of the steering shaft, in one direction or the other. At any moment it is thus possible to know the angle of rotation of the steering shaft knowing the angular position of this shaft during a turn, as a result of the signal VS, and the count recorded in the counter 11.

The output of the analog-digital converter 3 is connected to a first input of summing junction 20. The output of the up and down counter 11 is connected to a second input of the summing junction 20 and an output thereof provides the signal representative of the angle of rotation of the steering shaft.

The method of measuring the angle of rotation of the steering shaft according to the present invention necessitates determining the turn in which the steering shaft of the vehicle is situated when the latter travels in a straight line and zeroing of the rotation counter 11 when this "reference" turn is detected, and necessitates the up/down counting of the number of turns of the steering wheel from this reference turn.

In order to determine the "reference" turn, the method according to the present invention uses the following routine. After activation of the computer 4 (which coincides with start-up of the vehicle), the computer initializes to zero the counter 11 and the memory 10. The sensor 7 starts to supply speed data, sampled by processing of these data in the digital computer. For each new sample of the speed VV of the vehicle, this sample is compared to the contents VM of the memory 10, in the comparator 9.

If VV is greater than VM, the output of the comparator 10 activates the input RAZ of the counter 11 so as to zero the latter. At the same time VV is loaded in the memory in order to update VM.

If VV is less than VM, the output of the comparator has no effect either on the input RAZ of the counter 11 or on the memory 10.

It will be understood that, in this manner, the correlation existing between the speed of the vehicle and the position of the steering shaft enables the computer to determine very rapidly the "reference" turn corresponding to the vehicle travelling in a straight line. Once the vehicle has been started, its speed increases normally causing zeroing of the counter 11, described above. It is estimated that, as soon as the speed of the vehicle reaches 60 km/h, the steering shaft is necessarily in its first turn, the counter 11 thus being duly initialized by the procedure described above, a characteristic feature of the method according to the present invention.

It will be noted that if the speed VV of the vehicle were to drop again after this procedure of initialization of the counter 11, the comparison of VV to the value VM, which is greater and has been stored previously in the memory 10, would not result in the output of the comparator 10 having an effect on the input RAZ of the counter. The counter 11 thus being initialized, the turns of the steering shaft can now be counted.

According to the first embodiment of the present invention, counting is performed with the aid of data obtained from the voltage signal, VS, taken from the wiper 2 of the potentiometric sensor 1 and processed in the chain (3, 5, 6) during a period of time determined by the closure of a normally open switch 13 actuated by a cam 16 locked in rotation with the wiper 2. Reference is made to FIGS. 1 to 3 as a whole in order to describe this stage of the method according to the present invention.

The potentiometric sensor 1, as well as its operational connection to the switch 13, is shown in greater detail in FIG. 3. In this figure it can be seen that the wiper 2 is locked in rotation with a steering shaft 15 on which the steering wheel of the vehicle is mounted. A cam 16 is formed on the shaft 15, at 180° from the position of the wiper 2, this cam cooperating with a movable contact 17 so as to close the switch 13 when the wiper 2 falls into the "hole" of the resistance R consisting of a circular resistive track extending over 350° for example.

The cam 16 extends tangentially to the shaft 15 over a length such that the switch 13 closes just before the wiper 2 reaches the left-hand end (from the point of view of the figure) of the resistive track R, reopening of the switch occurring only after the wiper (rotating in theory in an anti-clockwise direction has reached the "right-hand" end of this track). Of course, a similar situation occurs when the wiper rotates with the steering shaft in a clockwise direction.

The switch 13 is connected to ground and to the voltage source Vref, via a resistance R2. Thus the voltage V18 at the common point between the switch 13 and the resistance R2 passes from the value zero to the value Vref when the switch opens (see FIG. 2B). This common point is connected by a line 18 to a validation input E of the counter 11 in order to activate an increment or decrement of the latter when the switch 13 closes. The role of this arrangement will be explained further below.

FIG. 2A shows the graph of the voltage VS on the resistance R, at the output of the sensor 1, as a function of the angle of rotation of the steering shaft, expressed in the number of turns and measured from a reference position corresponding to that of the movable contact 17 of the switch 13. The voltage is in the form of identical sawteeth separated by "troughs" which correspond to the cursor passing into the space which separates the two ends of the resistive track R1. It can be seen in FIG. 3 that the "left-hand" end of the track is connected to the reference voltage source Vref, while the "right-hand" end is connected to ground. Thus the amplitude of the sawteeth is equal to Vref.

It is clear that when the cursor 2 passes, in one direction or the other, from one end of the track to the other, the signal VS passes from the value Vref to zero or vice versa, i.e. from one of its extremes to the other.

According to the present invention, an increase, or a decrease, by one turn in the angle of rotation of the steering shaft is detected, while observing the direction of variation of the signal VS at the instant when the wiper 2 passes from one end of the track to the other. VS thus passes from zero to Vref or from Vref to Zero, depending on the direction of rotation of the cursor. Data for incrementing or decrementing the counter 11 is deduced therefrom, the counter thus being activated by grounding of its input E, due to closure of the switch 13.

Thus, when the switch 13 is open, the count of the counter 11 is not modified, except for re-initialization of this count to zero if the speed of the vehicle VV exceeds the value VM stored in the memory 10.

When the switch passes from the open state to the closed state, the last sample, prior to closure, of the digitalized value of VS is stored in the memory 6. The sample VSM stored is compared to the sample VS immediately after reopening of the switch.

If VS is greater than VSM, the output of the comparator 5 decrements the count of the counter 11 by one unit.

If VS is less than VSM, the output of the comparator 5 increments the count of the counter 11 by one unit.

Of course, when the switch remains closed, between its closed and reopening positions, means are provided for inhibiting the comparator 5.

Thus, as a result of the method and the device according to the present invention, the counter 11, correctly initialized, retains an updated value of the number of turns effected by the steering shaft in order to attain its current position. The corresponding angle of rotation is attained by combining this number of turns with the angular position of the shaft such that it may be deduced, during a turn, from the value of the signal VS.

The steering angle of the steering wheels of the vehicle, relative to the trajectory of the vehicle, is deduced from the angle of rotation thus calculated. This data, combined in particular with knowledge of the speed of the vehicle, enables the lateral acceleration to be calculated, which is an essential control parameter in adaptable-suspension devices.

Of course, the present invention is not limited to the method and the device described and shown, which have been provided merely by way of example.

It is, in fact, possible to count the turns of the steering shaft other than by using the sensor 2 and the switch 13 and the associated electronics described above.

According to a second embodiment of the present invention, data relating to passing of the "gap" of the resistance R is obtained from a single electronic processing of the signal VS. In fact, it is possible to choose a constant sampling period of the value VS of the signal emitted by the sensor, which is sufficiently short (of the order of 10 ms for example) for the computer to be able to deduce from the samples the speed of rotation of the steering shaft and hence of the steering wheel. Passing of the "gap" of the resistance R1 is detected by comparing the variations in this speed to a range of variations limited by physical limits due to the inertia involved and forces exerted by the driver of the vehicle on the steering wheel, which also have limits. A sudden variation in speed outside the aforementioned range indicates that the wiper is passing above the hole. The sign of the variation provides the direction of the movement.

The gap in potentiometer resistance R1 is detected by sampling the voltage, VS, with a short sampling period, for example, 10 ms. Due to several factors, such as the load on the front wheels of the vehicle, the degree of power steering assistance, the width of the tires, etc., the normal rotational speed for the steering wheel is about one turn per second. When passing the gap in resistance R1, the voltage VS increases (or decreases) by a value approximately equal to one turn (from the maximum value of VS to the minimum value or vice versa) in a period between two samples of the voltage VS. This results in an apparent rotational speed of one turn in 10 or 100 turns per second. By comparing this apparent rotational speed of 100 turns per second with a threshold of, for example, 10 turns per second (which is far beyond the physical possibilities in normal use of the steering wheel), it can be easily determined that a sudden variation of VS is caused by the wiper of the potentiometer passing the gap in the resistance track. Therefore, and in conjunction with the sign of the aforementioned variation of VS, it is possible to increment (or decrement) the counter 11 for counting the number of turns made by the steering wheel.

It will be noted that, in this embodiment of the present invention, the presence of the resistance R1 between ground and the wiper 2 is indispensable for forcing the voltage VS to zero) volts when the wiper 2 is no longer in contact with the resistive track of the sensor of FIG. 3. This causes a sudden variation in this voltage, which differs clearly from those variations resulting from maneuvers of the steering wheel on account of the inertia affecting them.

As a result of the present invention, a potentiometric sensor directly coupled to the steering shaft and the steering wheel can be used, thereby enabling the price of the reducing gear train commonly located between the shaft and the cursor of the sensor to be reduced.

Another saving is made possible by the present invention. In fact, assuming the resolution to be the same, the digital-analog converter 3 used for digitizing the signal VS representing the position of the steering shaft, during one turn only, may have a smaller conversion range (characterized by the number of bits required) than a converter which would have to function over the entire spread of the maximum angle of rotation of the steering shaft (about 4 turns, for example).

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for measuring the angle of rotation of a steering shaft of a motor vehicle with an angular position sensor emitting a signal varying between two extremes and representing the relative position of the shaft, comprising the steps of: measuring the speed VV of the vehicle; comparing the speed VV to a predetermined speed VM; zeroing a shaft rotation counter for counting rotations of the shaft when VV is greater than VM; detecting the direction of movement of the shaft to a position corresponding to an extreme of the signal emitted by the sensor, in order to increment or decrement the counter according to the direction detected; and combining the number of turns recorded in the counter with the current signal emitted by the sensor in order to form a signal representing the angle of rotation of the steering shaft.

2. The method according to claim 1, wherein the speed VM is loaded in a memory and the value loaded in the memory is updated with the value VV when VV is greater than VM.

3. The method according to claim 1, wherein the values of the signal emitted by the sensor in the vicinity of the extreme of this signal, on either side thereof, are compared, and the counter is incremented or decremented depending on whether this comparison results in a variation of the signal in one direction or in the opposite direction.

4. The method according to claim 1, wherein the magnitude and sign of variations in the signal supplied by the sensor are measured, and the counter is incremented or decremented when a signed discontinuity of this variation is detected, depending on whether this signed discontinuity has one sign or an opposite sign.

5. The method according to claim 1, wherein initialization of the counter to zero and of the speed VM to zero is performed when starting the measuring procedure.

6. A device for measuring the angle of rotation of a steering shaft of a motor vehicle, having an angular position sensor coupled in rotation with the steering shaft so as to emit a signal, VS, varying between two extremes and representing the relative position of the shaft, comprising: a speed sensor for measuring the speed, VV, of the vehicle; a shaft rotation counter for recording the number of turns of the steering shaft; a comparator for comparing the speed, VV, of the vehicle to a predetermined speed, VM, the comparator having an output; means for zeroing the counter when VV is greater than VM; means for detecting the movement and the direction of rotation of the steering shaft to an angular position corresponding to an extreme of the signal emitted by the sensor; means for incrementing or decrementing the counter according to the direction detected; and means for combining the count of the counter and the signal, VS, emitted by the sensor in order to form a signal representing the angle of rotation of the steering shaft.

7. The device according to claim 6, wherein the device further comprises a first memory containing the value, VM, the first memory being controlled by the output of the comparator and supplied by a digital analog converter which emits a digitized value of the speed, VV, of the vehicle measured by the speed sensor, the comparator performing updating of the value, VM, stored in the first memory using the current value, VV, of the speed when VV is greater than VM.

8. The device according to claim 7, wherein the means for detecting the movement and the direction of rotation of the steering shaft to an angular position corresponding to an extreme of the signal emitted by the sensor comprises: a second memory for receiving successive samples of the signal, VS, emitted by the angular position sensor; a comparator for comparing a last previous sample, VSM, of the signal, VS, stored in the second memory before the signal reaches an extreme, with the current sample of the signal, VS, after the signal has passed this extreme, the output of the comparator effecting an increment or decrement of the counter according to the result of the comparison.

9. The device according to claim 8, wherein the angular position sensor is a potentiometric sensor with a wiper sliding on an open circular resistive track having two facing ends corresponding to two extremes of the signal, VS, a cam rotating with the wiper and the shaft in order to close a switch when the wiper is located between the two ends of the resistive track of the angular position sensor, closing of this switch generating a signal activating means for detecting the direction of rotation of the shaft when the wiper of the angular position sensor passes over the ends of the track.

10. The device according to claim 9, wherein the cam is dimensioned so as to activate the detection means during a period of time which extends from an instant which precedes passing of the wiper over a first end of the track to an instant which immediately follows the passing of the wiper over the other end of the track.

11. The device according to claim 6, wherein the angular position sensor is a potentiometric sensor with a wiper sliding on an open circular resistive track having two facing ends corresponding to two extremes of the signal, VS, the means for detecting the movement and the direction of rotation of the steering shaft to a position corresponding to an extreme of the signal emitted by the angular position sensor having means for obtaining from successive samples of the signal, VS, a measurement of variations in the speed of rotation of the steering shaft, and means for deducing the instant when the shaft moves and its direction of rotation from a sudden variation in this speed, the sudden variations having an amplitude outside of a predetermined range of variations, and from the sign of this variation, respectively.

12. A device for implementing a method for measuring the angle of rotation of a steering shaft of a motor vehicle with an angular position sensor which emits a signal varying between two extremes and representing the relative position of the shaft, comprising: an angular position sensor coupled in rotation with the steering shaft so as to emit a signal, VS, representing the relative position of the shaft during one turn; a speed sensor on the vehicle for measuring the speed, VV, of the vehicle and outputting a signal representative thereof; a shaft rotation counter; a comparator for receiving the speed, VV, of the vehicle and a predetermined speed, VM; means for zeroing the shaft rotation counter when VV is greater than VM, the shaft rotation counter connected to an output of the comparator; means for detecting the movement and the direction of rotation of the steering shaft to an angular position corresponding to an extreme of the signal emitted by the angular position sensor; means for incrementing or decrementing the counter according to the direction detected; and means for combining the count of the counter and the signal, VS, emitted by the angular position sensor in order to form a signal representing the angle of rotation of the steering shaft.

13. The device according to claim 12, wherein the device further comprises a first memory containing the value VM, the first memory being connected and controlled by the output of the comparator on a first input of the first memory and the first memory having a second input connected to a digital-analog converter which emits a digitized value of the speed, VV, of the vehicle measured by the speed sensor, the comparator performing updating of the value VM stored in the first memory using the current value VV of the speed when VV is greater than VM.

14. The device according to claim 13, wherein the means for detecting the movement and the direction of rotation of the steering shaft to an angular position corresponding to an extreme of the signal emitted by the angular position sensor comprises a second memory having an input which receives the successive samples of the signal, VS, emitted by the angular position sensor, a further comparator having a first input for receiving the last previous sample, VSM, of the signal, VS, stored in the second memory before the signal reaches an extreme, and having a second input receiving the current sample of the signal, VS, after the signal has passed this extreme, the output of the further comparator effecting an increment or decrement to the counter according to the result of the comparison in the further comparator.

15. The device according to claim 14, wherein the angular position sensor is a potentiometric sensor with a wiper sliding on an open circular resistive track having two facing ends corresponding to two extremes of the signal, VS, a cam rotating with the wiper and the shaft in order to close a switch when the wiper is located between the two ends of the resistive track of the angular position sensor, the closing of the switch generating a signal activating means for detecting the direction of rotation of the shaft when the wiper of the angular position sensor passes over the ends of the track.

16. The device according to claim 15, wherein the cam is dimensioned so as to activate the detection means during a period of time which extends from an instant which precedes passing of the wiper over a first end of the track to an instant which immediately follows passing of the wiper over the other end of the track.

17. The device according to claim 12, wherein the angular position sensor is a potentiometric sensor with a wiper sliding on an open circular resistive track having two facing ends corresponding to two extremes of the signal, VS, the means for detecting the movement and the direction of rotation of the steering shaft to a position corresponding to an extreme of the signal emitted by the angular position sensor having means for obtaining from successive samples of the signal, VS, a measurement of variations in the speed of rotation of the steering shaft, and means for deducing the instant when the shaft moves and its direction of rotation from a sudden variation in this speed, the sudden variation having an amplitude outside of a predetermined range of variations, and from the sign of this variation, respectively.

* * * * *